United States Patent [19] [11] Patent Number: 4,599,375
Berte' et al. [45] Date of Patent: Jul. 8, 1986

[54] FLAMEPROOF POLYMERIC COMPOSITIONS CONTAINING ACID PIPERAZINE PYROPHOSPHATE

[75] Inventors: Ferruccio Berte'; Franco Marciandi; Marco Binaghi, all of Milan, Italy

[73] Assignee: Montedison S.p.A., Milan, Italy

[21] Appl. No.: 610,822

[22] Filed: May 16, 1984

[30] Foreign Application Priority Data

May 18, 1983 [IT] Italy ............................... 21149 A/83

[51] Int. Cl.$^4$ .......................... C08K 3/10; C08K 3/36; C08K 5/53; C08K 5/34
[52] U.S. Cl. .................................... 524/100; 524/413; 524/510; 524/565; 524/572; 524/575; 524/583; 524/585
[58] Field of Search ............... 524/100, 413, 510, 565, 524/572, 575, 583, 585

[56] References Cited

U.S. PATENT DOCUMENTS 3,810,850  5/1974  Rowton .............................. 524/100
4,336,182  6/1982  Landoni et al. ...................... 524/612

OTHER PUBLICATIONS

C.A. 80-122608(b) 1974 Kitawaki et al. J73-88791.

Primary Examiner—Herbert J. Lilling

[57] ABSTRACT

Polymeric compositions endowed with high flame self-extinguishing properties, comprising a polymer selected from amongst olefinic polymers, polystyrene, polybutylene terephthalate, SAN and ABS copolymers, and also, for 100 parts of composition:

(a) 20–50 parts of piperazine acid pyrophosphate;
(b) 0–3 parts of at least a compound selected from $TiO_2$, $SiO_2$, silicic acid, in powder having particle size $\leq 0.1$ micron;
(c) 0–35 parts of at least a compound selected from ammonium polyphosphate, melamine, melamine phosphate and pyrophosphate, polycarboxypiperazine, ethylene urea/formaldehyde condensates, as a substitute for an equal weight of compound (a), and in such amount that the composition still contains at least 5 parts of such compound (a).

7 Claims, No Drawings

FLAMEPROOF POLYMERIC COMPOSITIONS CONTAINING ACID PIPERAZINE PYROPHOSPHATE

THE PRIOR ART

The addition of flameproof agents of synthetic polymers to substances capable of producing intumescence, offers various advantages as compared with the conventional additives based on halogen compounds in synergism with antimony.

In particular, the addition of the intumescent type permits to obtain formulations having a low emission of fumes and exerting a less corrosive action on the equipment used for processing the polymer, due to the non-emission of aggressive substances, such as halogen acids.

The formulations of intumescent type generally consist of the polymer and of at least two main additives: one essentially phosphorated the purpose of which being that of forming, during combustion an impermeable, semi-solid vitreous layer substantially consisting of polyphosphoric acid, and the other containing nitrogen and carbon, acting as a foaming agent and as a carbon donor for producing a cellular carbonaceous insulating layer between polymer and flame.

Examples of two-additive formulations are contained in European Patent publication No. 23353, in which the phosphorated portion essentially consists of ammonium polyphosphate and the nitrogenous portion consists of more or less polycondensated heterocyclic compounds.

It is also possible to obtain flameproof compositions by using mono-component additives containing both nitrogen and phosphorus in the molecule.

A typical example is ammonium polyphosphate, which alone and at very high concentrations ($\geq 40\%$ by weight referred to the polymer) allows to obtain self-extinguishing formulations of class UL 94 VO. Other compounds capable of providing the self-extinguishing characteristic if used as individual additives are the phosphoric salts of piperazine. U.S. Pat. No. 3,810,850 describes the use of acid and neutral orthophosphates as well as of neutral phosphate of piperazine as flameproof agents for compositions based on polyurethanes, polyesters, epoxy resins and polyvinylacetate, to be essentially utilized as self-extinguishing coatings or paints.

However, such piperazine orthophosphates and pyrophosphates are not suited to render the abovesaid polymeric materials, and the polymers in general, flameproof when these are to be processed or subjected to transformations at high temperatures, for example above 200° C., as occurs for the polyolefins, or when they are subjected to a long-lasting contact with water or with aqueous solutions, or also to a long-lasting thermal ageing. In such circumstances, the so additioned polymeric materials lose their self-extinguishing characteristics at least partially, which limits the use of the abovesaid additives to particular polymers and/or applications thereof.

THE PRESENT INVENTION

We have now found that the acid pyrophosphate of piperazine of formula:

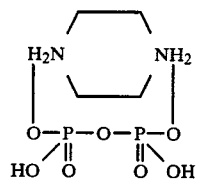

represents an additive capable of imparting flameproof properties to many polymers, and in particular to olefinic polymers and copolymers, to polystyrene, polybutylene terephthalate and to styrol/acrylonitrile and styrol/acrylonitrile/butadiene copolymers, without the drawbacks encountered with the acid and neutral orthophosphates of piperazine, and with the neutral pyrophosphate of piperazine.

We have also found that a particularly effective synergistic antiflame activity towards the abovementioned polymers occurs when the piperazine acid pyrophosphate is used in combination with nitrogenous compounds and/or phosphorus-containing compounds such as melamine phosphates and pyrophosphates, ammonium polyphosphate, melamine, the products of the condensation between ethylene urea and formaldehyde, as are described in European patent application No. 37706, and polycarboxypiperazine, the antiflame activity thereof being described in European patent application No. 23353. Such synergistic activity has furthermore proved to occur and even to be enhanced by the presence of fillers, in low amounts, based on $TiO_2$, $SiO_2$ and silicic acid in the form of ultrafine powder (with particle sizes equal to or below 0.1 micron).

Thus, it is an object of the present invention to provide polymeric compositions, endowed with high self-extinguishing characteristics to the flame, comprising at least a polymer selected from the olefinic polymers, polystyrene, polybutylene-terephthalate, acrylonitrile/styrene copolymers (SAN) and acrylonitrile/styrene/butadiene copolymers (ABS), and furthermore, for 100 parts by weight of composition consisting of such polymer and with the flameproof additives:

(a) from 20 to 50 parts of piperazine acid pyrophosphate (PAP);

(b) from 0 to 3, and preferably from 1 to 1.5 parts of at least a compound selected from $TiO_2$, $SiO_2$ and silicic acid, in the form of powder having particle size below or equal to 0.1 micron;

(c) from 0 to 35, but preferably from 1 to 25 parts of at least a compound selected from melámine phosphates and pyrophosphates, melamine, ammonium polyphosphate, polycarboxypiperazine and ethyleneurea/formaldehyde condensates, as a substitute for an equal weight of acid pyrophosphate of piperazine, and in such amount that the composition will anyhow contain at least 5 Parts of acid pyrophosphate of piperazine for 100 parts of composition.

The preferred amount of acid piperazine pyrophosphate, according to which such compound, either alone or even better if combined with the synergistic compounds described hereinabove, proves particularly effective, is different from polymer to polymer; it ranges, referred to 100 parts of composition composed by the polymer and optionally the abovesaid additives, from 24 to 35 parts for polypropylene, or from 20 to 35 parts for polybutylene-terephthalate, from 35 to 50 parts for polystyrene, from 30 to 40 parts for polyethylene, and from 40 to 50 parts for the SAN and ABS copolymers.

The useful ammonium polyphosphate falls under the general formula:

$$(NH_4)_{n+2}P_nO_{3n+1},$$

wherein n is an integer equal to or higher than 2; preferably, the polyphosphates' molecular weight should be high enough to assure a low solubility in water.

The composition of the polyphosphates having the above formula, in which n is a sufficiently high number, is in practice the one corresponding to the formula of metaphosphates $(NH_4PO_3)_n$.

Such polyphosphates are, for example, those known under the trade designation "Exolit" (263, 422) (produced and sold by Benckiser Knapsack G.m.b.H.) and having the composition $(NH_4PO_3)_n$ in which n is higher than 50; or the product known under the trademark "Phos-Check P/30" (produced and sold by Monsanto Chem.), having an analogous composition.

Heat and light stabilizers, pigments and other coadjuvants in the processing of the abovesaid polymers may be present in such compositions in amounts up to 5 parts by weight, preferably from 0.5 to 2 parts by weight referred to 100 parts by weight of composition. Among such stabilizers, mercaptobenzoimidazole and 4-methylthiouracyl prove to be particularly effective for imparting a long-lasting stability to thermal ageing to the compositions.

As olefinic polymers to be included in the compositions of the present invention there may be cited low density polyethylene and high density polyethylene, polypropylene prevailingly consisting of isotactic macromolecules, ethylene/propylene copolymers, either statistical or in blocks, as well as cross-linked, and ethylene/propylene/diene terpolymers.

The self-extinguishing compositions of the present invention are preparable according to known methods: for example, acid piperazine pyrophosphate finely ground (preferably with particle size below 50 micron) is first intimately mixed optionally with the other additives, and the resulting mixture is added to the thermoplastic polymer in a turbomixer to form a homogeneous mix which is then extruded and granulated. It is also possible to mix the polymer and the flameproof additives in a Banbury or Brabender mixer at the polymer plasticizing temperature. The resulting mix is then extruded in a Dolci extruder (screw diameter=20 mm, length/diameter ratio=23, screw speed=20 rmp) at the temperature which is best suited to obtain a product in granules, such temperature being different from polymer to polymer. The granular product so obtained can be transformed into various articles by means of any conventional molding techniques.

To determine the self-extinguishing properties of the polymeric compositions containing the flameproof additives it was operated as follows: with the granular additioned polymer, thin plates having a 3 mm thickness (⅛ inch) were molded in a Carver-type plate press, by working for 7 minutes at a pressure of 40 Kg/cm² and at proper temperatures, different from polymer to polymer. On the thin plates so prepared, the self-extinguishing level can be determined by measuring the oxygen index (according to standard ASTM-D 2863) in a Stanton Redcroft apparatus, or according to standards UL94 (published by "Underwriter Laboratoties'-'—USA) which provide an evaluation of the self-extinguishing degree of plastic materials.

For the tests reported in the following tables, the Vertical Burning Test was adopted, which enables to classify the material at three levels: 94 V0/94 V1/94 V2, which express in the decreasing order the uninflammability degree.

PREPARATION OF ACID PIPERAZINE PYROPHOSPHATE

Procedure

In a 5-liter beaker, a suspension of 750 g of sodium pyrophosphate $Na_4P_2O_7.10H_2O$ in 2500 cc of water was prepared, it was cooled to about 10° C. in an ice bath and then it was acidified with 563 cc of 37% HCl, at a maximum temperature of about 12° C. A limpid and acid solution was obtained.

149 g of piperazine (97%) dissolved in 625 cc of water at a maximum temperature of about 22° C. were then added. A white crystalline precipitate formed (pH=4-5). It was maintained under stirring in an ice bath for 2-3 hours (at a temperature of about 7° C.). It was filtered, washed with $H_2O$ and dried in a ventilation oven at 105° C. for about 6 hours. 235 g of acid pyrophosphate of piperazine with a yield of 53% were thus obtained. The product was stable up to at least 280° C.

Solubility in $H_2O$ (room temperature) was lower than 1.2 g in 100 cc of water.

The following examples are given to illustrate the present invention, without limiting it.

Examples 1-15 (of which the first two are comparative tests) refer to the compositions based on polypropylene, illustrated in Table 1.

Examples 16-19 are comparative tests between the polypropylene compositions containing acid piperazine pyrophosphate and the ones containing acid and neutral orthophosphate, and neutral piperazine pyrophosphate, further to immersion of the specimens into water at 100° C., and successive drying at 70° C. for 8 hours.

The characteristics of such compositions are indicated in Table 2.

Examples 20-25 refer to polyethylene compositions, the characteristics of which are recorded on Table 3.

Examples 26-30 relate to compositions based on polystyrene, polybutylene-terephthalate and ABS, the characteristics of which are reported on Table 4. The amounts of all the compositions' components are given by weight.

The neutral and acid orthophosphates, and the neutral pyrophosphate of piperazine were prepared as follows:

neutral piperazine orthophosphate 200 g of $H_3PO_4$ (85%) in 200 cc of $H_2O$ were reacted with 153.8 g of piperazine (97%) in 600 cc of $H_2O$ at a maximum temperature of 80° C. and a pH of about 7. The resulting precipitate, consisting of piperazine orthophosphate, was diluted with 500 cc of $H_2O$, was recovered by filtration and dried at 105° C.

acid piperazine orthophosphate 200 g of $H_3PO_4$ (85%) in 200 cc of $H_2O$ were reacted with 77 g of piperazine (97%) in 300 cc of $H_2O$ at a maximum temperature of 65° C. and at a pH of about 5. The precipitate, consisting of the acid orthophosphate of piperazine, was maintained at a temperature from 0° to 5° C. for about 20 hours, then it was filtered and dried.

neutral piperazine pyrophosphate 300 g of $Na_4P_2O_7$ (95%) were added to a solution of 356 cc of HCl at 37% in 1600 cc of $H_2O$, at a temperature below 10° C., then, to the solution so obtained, there were added 190 g of piperazine (97%) dissolved in 830 cc of $H_2O$. The mixture, containing the white precipitate of acid piperazine pyrophosphate, was diluted with 800 cc of $H_2O$, then it was stirred, filtered, and the precipitate was dried.

TABLE 1

| | EXAMPLES | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Formulation | | | | | | | | | | | | | | | |
| Polypropylene (M.I. = 3.5) | 73 | 73 | 73 | 74,8 | 74 | 74 | 74 | 73 | 73 | 73 | 73 | 73 | 73 | 73 | 73 |
| Ammonium polyphosphate (Exolit 422) | 24 | — | — | — | — | — | — | 14,5 | — | — | — | 5 | 8 | 8 | — |
| Melamine phosphate | — | 24 | — | — | — | — | — | — | 6 | 10 | — | 6,5 | 6,5 | 4 | — |
| Acid piperazine pyrophosphate | — | — | 24 | 24,6 | 24 | 24 | 24 | 9,5 | 18 | 14 | 22 | 12,5 | 9,5 | 9 | 18 |
| Polycarboxypiperazine | — | — | — | — | — | — | — | — | — | — | 2 | — | — | — | — |
| Ethyleneurea/formaldehyde condensate | — | — | — | — | — | — | — | — | — | — | — | — | — | — | 6 |
| Melamine | — | — | — | — | — | — | — | — | — | — | — | — | — | 3 | — |
| TPL* | 0,4 | 0,4 | 0,4 | 0,4 | 0,4 | 0,4 | 0,4 | 0,4 | 0,4 | 0,4 | 0,4 | 0,4 | 0,4 | 0,4 | 0,4 |
| MBI** | 1 | 1 | 1 | — | — | — | — | 1 | 1 | 1 | 1 | 1 | 1 | 1 | 1 |
| $TiO_2$ | 1,4 | 1,4 | 1,4 | — | 1,4 | — | — | 1,4 | 1,4 | 1,4 | 1,4 | 1,4 | 1,4 | 1,4 | 1,4 |
| $SiO_2$*** | — | — | — | — | — | 1,5 | — | — | — | — | — | — | — | — | — |
| Silicic acid**** | — | — | — | — | — | — | 1,5 | — | — | — | — | — | — | — | — |
| Irganox 1010 | 0,2 | 0,2 | 0,2 | 0,2 | 0,2 | 0,2 | 0,2 | 0,2 | 0,2 | 0,2 | 0,2 | 0,2 | 0,2 | 0,2 | 0,2 |
| Self-extinguishing properties on a ⅛" thick specimen | | | | | | | | | | | | | | | |
| UL 94 vert. | burns | burns | V-0 | burns | V0 | V-0 | V0 | V-0 | V-0 | V-0 | V-0 | V-0 | V-0 | V-0 | V-0 |
| Total time of combustion (10 ignitions, in seconds) | — | — | 41 | — | — | 31 | — | 22 | 3 | 10 | 35 | 15 | 16 | 4 | 37 |
| Oxygen index | 20 | 22 | 34 | 29 | 36 | 35 | 36 | — | — | — | — | — | 37,5 | — | — |

*lauryl thiopropionate
**mercaptobenzoimidazole
***Aerosil 300 produced by DEGUSSA
****silicic acid N20/HKD produced by WACKER

TABLE 2

| | Examples | | | |
|---|---|---|---|---|
| | 16 | 17 | 18 | 19 |
| Formulation | | | | |
| Polypropylene (M.I. = 3.5) | 67 | 67 | 67 | 67 |
| Acid pyrophosphate of piperazine | 30 | — | — | — |
| Neutral orthophosphate of piperazine | — | 30 | — | — |
| Acid orthophosphate of piperazine | — | — | 30 | — |
| Neutral pyrophosphate of piperazine | — | — | — | 30 |
| TPL | 0.4 | 0.4 | 0.4 | 0.4 |
| MBI | 1 | 1 | 1 | 1 |
| Irganox 1010 | 0.2 | 0.2 | 0.2 | 0.2 |
| $TiO_2$ | 1.4 | 1.4 | 1.4 | 1.4 |
| Self-extinguishing characteristics on a ⅛" thick specimen after different times of immersion in water at 100° C. | | | | |
| UL 94 vert.: | | | | |
| after 0 hours | V-0 | V-0 | V-0 | V-0 |
| after 4 hours | V-0 | burns | V-1 | burns |
| after 8 hours | V-0 | — | V-2 | — |
| after 16 hours | V-0 | — | burns | — |
| after 24 hours | V-1 | — | — | — |
| Combustion time (10 ignitions, in seconds) | | | | |
| after 0 hours | 2 | 35 | 10 | 15 |
| after 4 hours | 22 | — | 55 | — |
| after 8 hours | 25 | — | — | — |
| after 16 hours | 46 | — | — | — |
| after 24 hours | 80 | — | — | — |

TABLE 3

| | Examples | | | | | |
|---|---|---|---|---|---|---|
| | 20 | 21 | 22 | 23 | 24 | 25 |
| Formulation | | | | | | |
| Polyethylene (d. = 0.92, M.I. = 0.25) | 65 | 65 | 65 | 70 | 70 | 70 |
| Acid pyrophosphate of piperazine | 14 | 24 | 12.7 | 12 | 20 | 11 |
| Ammonium polyphosphate | 18 | — | 10.7 | 15 | — | 9 |
| Melamine phosphate | — | 8 | 8.6 | — | 7 | 7 |
| TPL | 0.4 | 0.4 | 0.4 | 0.4 | 0.4 | 0.4 |
| MBI | 1 | 1 | 1 | 1 | 1 | 1 |
| Irganox 1010 | 0.2 | 0.2 | 0.2 | 0.2 | 0.2 | 0.2 |
| $TiO_2$ | 1.4 | 1.4 | 1.4 | 1.4 | 1.4 | 1.4 |
| Self-extinguishing characteristics on a ⅛" thick specimen | | | | | | |
| UL 94 vert. | V-0 | V-0 | V-0 | V-0 | V-0 | V-0 |

TABLE 3-continued

|  | Examples | | | | | |
| --- | --- | --- | --- | --- | --- | --- |
|  | 20 | 21 | 22 | 23 | 24 | 25 |
| Combustion time (seconds) | 24 | 13 | 14 | 30 | 12 | 16 |

TABLE 4

|  | Examples | | | | |
| --- | --- | --- | --- | --- | --- |
|  | 26 | 27 | 28 | 29 | 30 |
| Formulation |  |  |  |  |  |
| Polybutyleneterephthalate | — | — | — | 73 | 78 |
| Polystyrene containing 10% by weight of grafted polybutadiene rubber | 32.5 | 35 | — | — | — |
| Polystyrene | 32.5 | 35 |  |  |  |
| SAN* | — | — | 37.1 | — | — |
| ABS** | — | — | 27.9 | — | — |
| Acid pyrophosphate of piperazine | 12.7 | 10.7 | 12.7 | 9.5 | 7.4 |
| Ammonium polyphosphate | 10.7 | 9 | 10.7 | 8 | 6.3 |
| Melamine phosphate | 8.6 | 7.3 | 7.3 | 5.5 | 4.3 |
| Melamine | — | — | 1.3 | — | — |
| TPL | 0.4 | 0.4 | 0.4 | 0.4 | 0.4 |
| MBI | 1 | 1 | 1 | 1 | 1 |
| $TiO_2$ | 1.4 | 1.4 | 1.4 | 1.4 | 1.4 |
| Self-extinguishing characteristics on a ⅛" thick specimen |  |  |  |  |  |
| UL 94 vert. | V-0 | V-1 | V-0 | V-0 | V-0 |
| Oxygen index |  |  |  |  |  |

*Styrene/acrylonitrile copolymer (24/76 by weight) type KOSTIL AP 300 produced by Montedison
**Styrene/acrylonitrile copolymer (24/76 by weight) type KOSTIL AP 300 grafted with 40% by weight of polybutadiene.

What we claim is:

1. Polymeric compositions, endowed with high self-extinguishing properties when exposed to flame, comprising (1) at least one polymer selected from the group consisting of polyethylene prevailing isotactic polypropylene, polystyrene, copolymers of acrylonitrile and styrene and copolymers of acrylonitrile, styrene and butadiene and (2) for 100 parts by weight of the composition:
   (a) 20 to 50 parts of acid piperazine pyrophosphate;
   (b) 0 to 3 parts of at least one compound selected from the group consisting of $TiO_2$, $SiO_2$ and silicic acid, in powder having particles size lower than or equal to 0.1 micron;
   (c) 0 to 35 parts of at least one compound selected from the group consisting of melamine phosphates and pyrophosphates, melamine, ammonium polyphosphate, polycarboxy-piperazine and condensates of ethylene-urea and formaldehyde, as a substitute for an equal weight of acid piperazine pyrophosphate, and in such amount that the composition contains at least 5 parts of acid piperazine pyrophosphate for 100 parts of composition.

2. The compositions according to claim 1, in which compound (b) is present in amounts ranging from 1 to 1.5 parts by weight.

3. The compositions according to claim 1, in which compound (c) is present in amounts ranging from 1 to 25 parts by weight.

4. The compositions according to claim 1 in which the polymer consists of a polypropylene, and compound (a) ranges from 24 to 35 parts by weight.

5. The compositions according to claim 1, in which the polymer is polystyrene and compound (a) is present in amounts ranging from 35 to 50 parts by weight.

6. The compositions according to claim 1, in which the polymer is polyethylene and compound (a) is present in amounts ranging from 30 to 40 parts by weight.

7. The compositions according to claim 1, in which the polymer is a styrene/acrylonitrile/(butadiene) copolymer and compound (a) is present in amounts ranging from 40 to 50 parts by weight.

* * * * *